(12) United States Patent
Yoo et al.

(10) Patent No.: US 8,093,813 B2
(45) Date of Patent: Jan. 10, 2012

(54) PLASMA DISPLAY PANEL

(75) Inventors: Younggil Yoo, Yongin-si (KR); Bohoon Kim, Yong-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/872,975

(22) Filed: Aug. 31, 2010

(65) Prior Publication Data

US 2011/0084595 A1    Apr. 14, 2011

(30) Foreign Application Priority Data

Oct. 12, 2009 (KR) ........................ 10-2009-0096629

(51) Int. Cl.
*H01J 17/49* (2006.01)
(52) U.S. Cl. ...................................... 313/582
(58) Field of Classification Search .......... 313/490–494, 313/582–587
See application file for complete search history.

(56) References Cited

U.S. PATENT DOCUMENTS

2008/0129201 A1*  6/2008  Hong ............................ 313/586

FOREIGN PATENT DOCUMENTS

| KR | 10 2002-0050301 | | 6/2002 |
| KR | 10 2002-0070741 | | 9/2002 |
| KR | 10 2007-0102302 | A | 10/2007 |
| KR | 10 2008-0007895 | A | 1/2008 |
| WO | WO 01/39239 | A1 | 5/2001 |

* cited by examiner

*Primary Examiner* — Toan Ton
*Assistant Examiner* — Hana Featherly
(74) *Attorney, Agent, or Firm* — Christie, Parker & Hale, LLP

(57) ABSTRACT

A plasma display panel enhancing an emission efficiency of a green phosphor layer by increasing an excitation efficiency of a green phosphor layer using visible light emitted from a dielectric layer or barrier ribs, the plasma display panel including a first substrate and a second substrate disposed to face the first substrate. A plurality of display electrodes are formed on the first substrate. A first dielectric layer is formed on the first substrate to cover the display electrodes. A plurality of address electrodes are formed on the second substrate in a direction crossing the display electrodes. A second dielectric layer is formed on the second substrate to cover the address electrodes. Barrier ribs are disposed in a space between the first dielectric layer and the second dielectric layer to form a plurality of discharge cells. The second dielectric layer and the barrier ribs comprise a short wavelength phosphor material.

18 Claims, 8 Drawing Sheets

<Lower Region of Green Phosphor Layer>

<Upper Region of Green Phosphor Layer>

FIG. 9

|  | Wavelength of Light | Condition | X Color Coordinate | Y Color Coordinate | Luminance | Relative Luminance |
|---|---|---|---|---|---|---|
| 1st Measurement | 146nm | 1 | 0.404 | 0.560 | 20.79 | 100.0% |
|  |  | 2 | 0.404 | 0.557 | 22.97 | 110.5% |
|  |  | 3 | 0.146 | 0.052 | 0.82 | 4.0% |
| 2nd Measurement | 172nm | 1 | 0.404 | 0.560 | 88.56 | 100.0% |
|  |  | 2 | 0.404 | 0.555 | 93.70 | 105.8% |
|  |  | 3 | 0.145 | 0.048 | 2.48 | 2.8% |
| 3rd Measurement | 146nm | 1 | 0.405 | 0.560 | 20.36 | 100.0% |
|  |  | 2 | 0.404 | 0.557 | 22.62 | 111.1% |
|  |  | 3 | 0.147 | 0.052 | 0.81 | 4.0% |
| 4th Measurement | 172nm | 1 | 0.404 | 0.560 | 88.56 | 100.0% |
|  |  | 2 | 0.404 | 0.555 | 93.70 | 105.8% |
|  |  | 3 | 0.145 | 0.048 | 2.48 | 2.8% |

PLASMA DISPLAY PANEL

CROSS-REFERENCE TO RELATED APPLICATION

This application claims priority to and the benefit of Korean Patent Application No. 10-2009-0096629, filed Oct. 12, 2009, in the Korean Intellectual Property Office, the disclosure of which is incorporated herein by reference.

BACKGROUND

1. Field

Aspects of the present invention relate to a plasma display panel which can enhance the overall emission efficiency of a green phosphor layer.

2. Description of the Related Art

In general, a plasma display panel (PDP) is a display device that forms an image by emitting visible light by exciting a phosphor layer with vacuum ultraviolet (VUV) rays emitted from plasma generated by a gas discharge.

A conventional plasma display panel includes a first panel and a second panel. The first panel includes a pair of display electrodes disposed on a first substrate, a first dielectric layer covering the display electrodes, and a protective layer covering the first dielectric layer. The second panel includes address electrodes, which are formed on a second substrate facing the first substrate, a second dielectric layer covering the address electrodes, barrier ribs formed between a protective layer and the second dielectric layer and defining a plurality of discharge cells, and red (R), green (G) and blue (B) phosphor layers formed in the discharge cells.

When discharge gas is injected into the discharge cells of the plasma display panel, a gas discharge occurs and the VUV rays generated by the gas discharge excite the phosphor layers to emit visible light. The higher the excitation efficiency of phosphor layer, the higher the luminance of plasma display panel. Accordingly, there are increasing demands for plasma display panels having higher excitation efficiency of phosphor.

SUMMARY

Aspects of the present invention provide a plasma display panel which can enhance the overall emission efficiency of a green phosphor layer by increasing an excitation efficiency of the green phosphor layer having low excitation efficiency using visible light emitted from a dielectric layer or barrier ribs.

According to aspects of the present invention, there is provided a plasma display panel including a first substrate, a second substrate disposed to face the first substrate, a plurality of display electrodes formed on the first substrate, a first dielectric layer formed on the first substrate to cover the display electrodes, a plurality of address electrodes formed on the second substrate in a direction crossing the display electrodes, a second dielectric layer formed on the second substrate to cover the address electrodes, barrier ribs disposed in a space between the first dielectric layer and the second dielectric layer and forming a plurality of discharge cells, and phosphor layers including a red phosphor layer, a green phosphor layer and a blue phosphor layer formed inside respective discharge cells, wherein the second dielectric layer may be a short wavelength phosphor material.

According to another aspect of the present invention, the short wavelength phosphor material may be $BaMgAl_{10}O_{17}$:Eu or $CaMgO_6$:Eu.

According to another aspect of the present invention, the short wavelength phosphor material may be a material emitting visible light having a wavelength of about 400 to about 530 nm.

According to another aspect of the present invention, an upper region of the green phosphor layer may be excited by ultraviolet rays produced by a gas discharge to then emit green visible light.

According to another aspect of the present invention, a lower region of the green phosphor layer is in contact with the second dielectric layer, and emits green visible light by visible light generated from the short phosphor material of the second dielectric layer.

According to another aspect of the present invention, the green phosphor layer may be formed of a YAG:Ce phosphor material.

According to another aspect of the present invention, the barrier ribs may be formed to include a short wavelength phosphor material.

According to another aspect of the present invention, a side region of the green phosphor layer is in contact with the barrier ribs, and emits green visible light by visible light generated from the short phosphor material of the second barrier ribs.

According to another aspect of the present invention, in the plasma display panel, since a dielectric layer or barrier ribs in contact with a phosphor layer includes a short wavelength phosphor material, the excitation efficiency of a portion where excitation efficiency is low in a green phosphor layer can be increased using visible light emitted from a non-luminous portion.

Thus, according to aspect of the present invention, the plasma display panel can increase the excitation efficiency of the overall green phosphor layer, which is a crucial part in determining the emission efficiency of the plasma display panel, and in turn increases the emission efficiency of the green phosphor layer. Therefore, the overall luminance of the plasma display panel according to an aspect of the present invention can be enhanced.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 illustrates luminance data of a green phosphor layer of a plasma display panel measured in various conditions.

DETAILED DESCRIPTION

Figure 1:
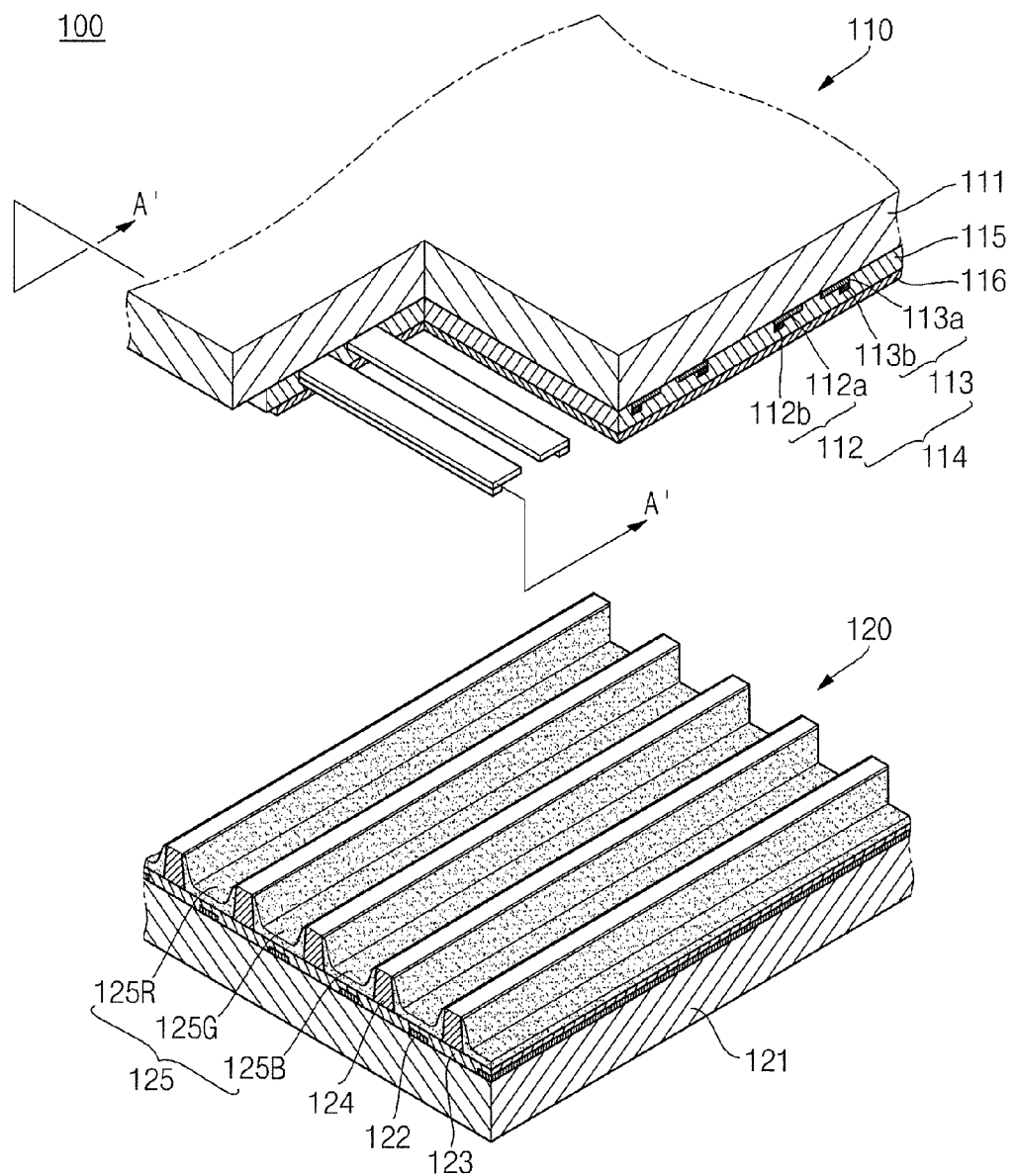
FIG. 1 is a partial cutaway perspective view of a plasma display panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, it is to be understood that where is stated herein that one element or layer is "formed on" or "disposed on" a second layer or element, the first layer or element may be formed or disposed directly on the second layer or element or there may be intervening layers or elements between the first layer or element and the second layer or element. Further, as used herein, the term "formed on" is used with the same meaning as "located on" or "disposed on" and is not meant to be limiting regarding any particular fabrication process.

Figure 2:
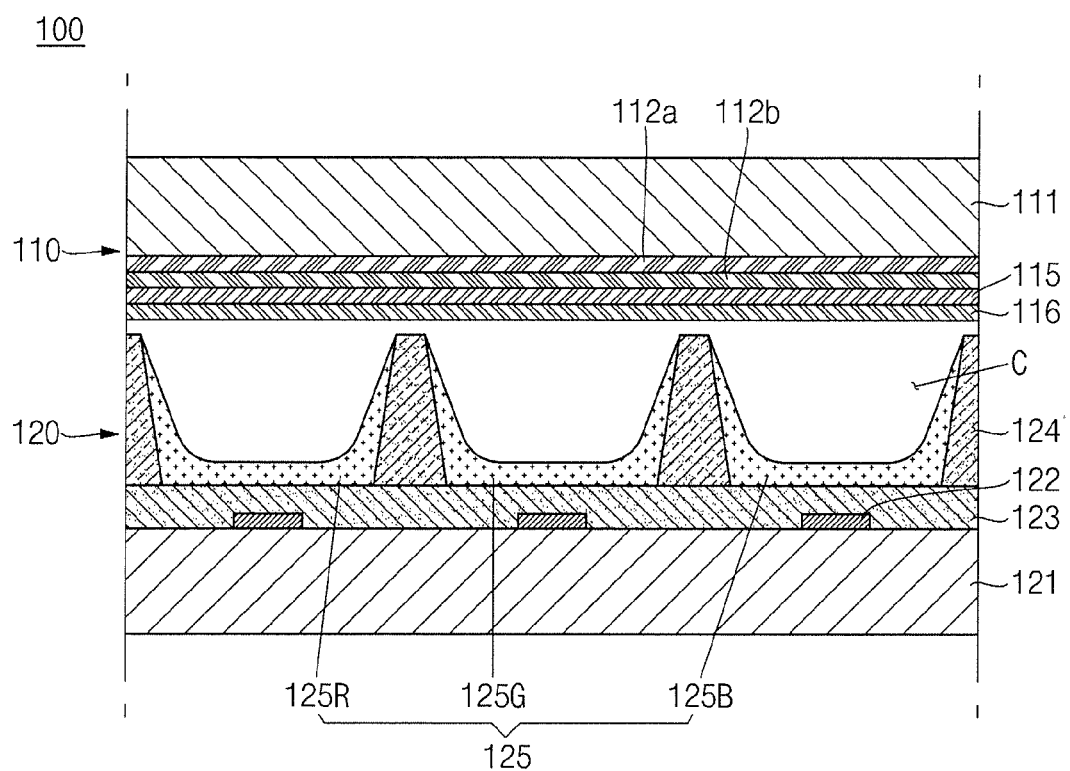
FIG. 2 is a cross-sectional view taken along line A-A' of FIG. 1.
Figure 3:
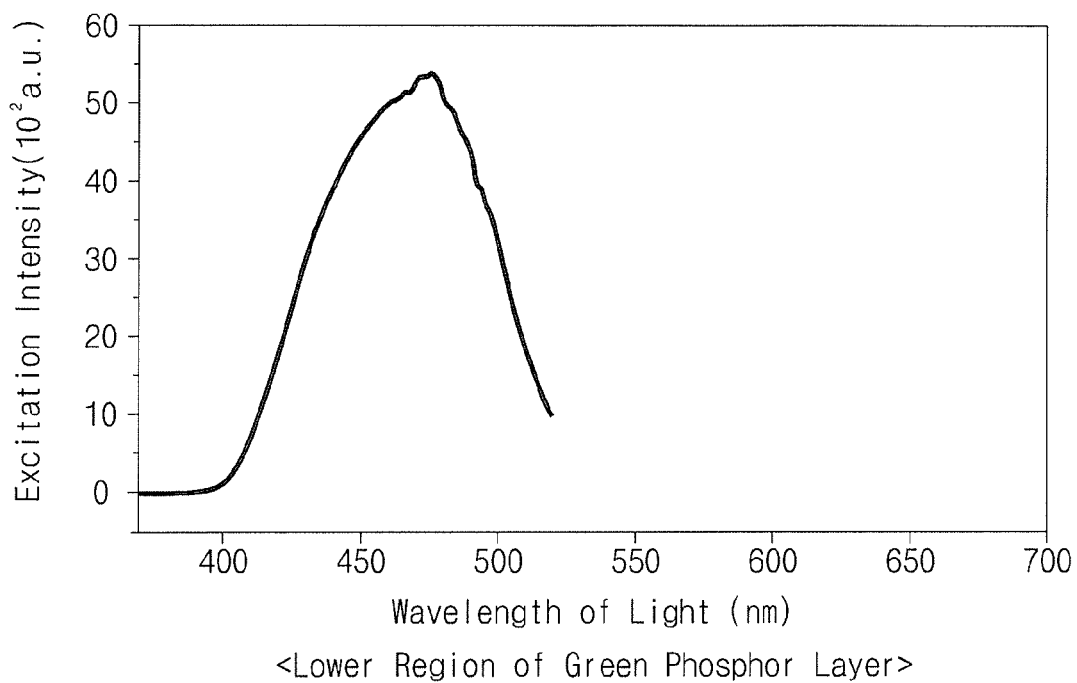
FIG. 3 is a graph illustrating the excitation spectrum measured at a lower region of a green phosphor layer.
Figure 4:
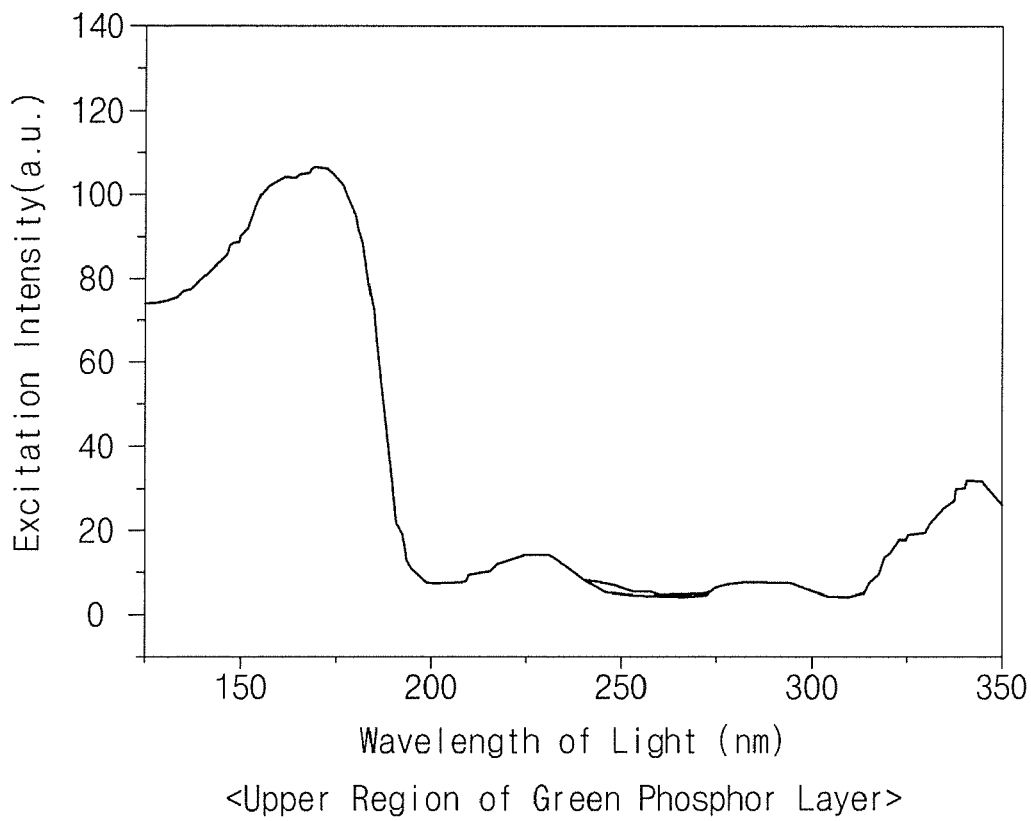
FIG. 4 is a graph illustrating the excitation spectrum measured at an upper region of a green phosphor layer.

FIG. 1 is a partial cutaway perspective view of a plasma display panel according to an embodiment of the present invention, FIG. 2 is a cross-sectional view taken along line A-A' of FIG. 1, FIG. 3 is a graph illustrating the excitation spectrum measured at a lower region of a green phosphor layer; and FIG. 4 is a graph illustrating the excitation spectrum measured at an upper region of a green phosphor layer.

Referring to FIGS. 1 and 2, the plasma display panel 100 according to an embodiment of the present invention includes a first panel 110 and a second panel 120. The first panel 110 includes a plurality of display electrodes 114, a first dielectric layer 115, and a protective layer 116 sequentially formed on a first substrate 111.

The plurality of display electrodes 114 include scan electrodes 112 and sustain electrodes 113 formed on a bottom surface of the first substrate 111, and which are used for a display discharge of the plasma display panel 100. Each of the scan electrodes 112 includes a transparent electrode 112a and a bus electrode 112b. Each of the sustain electrodes 113 includes a transparent electrode 113a and a bus electrode 113b.

The transparent electrodes 112a and 113a are formed in a transverse direction of the plasma display panel 100 across the first substrate 111. The transparent electrodes 112a and 113a are made of transparent conductive materials to allow visible light to pass, for example, indium-doped tin oxide (ITO) or antimony-doped tin oxide (ATO). However, aspects of the present invention are not limited thereto and other transparent conductive materials may be used.

The bus electrodes 112b and 113b are formed on the transparent electrodes 112a and 113a in parallel with the transparent electrodes 112a and 113a and are electrically connected to the transparent electrodes 112a and 113a. In order to compensate for low electrical conductivity of the transparent electrodes 112a and 113a, the bus electrodes 112b and 113b are made of a conductive material having high electric conductivity. For example, the bus electrodes 112b and 113b are made of an inorganic compound having Cr—Cu—Cr or Ag as a major component. However aspects of the present invention are not limited thereto and other inorganic compounds may be used. Meanwhile, the bus electrodes 112b and 113b are black colored to prevent reflection of external light. However, aspects of the present invention are not limited thereto and other colors may be used for the bus electrodes to prevent reflection of external light.

The first dielectric layer 115 is formed on the first substrate 111 to cover the scan electrodes 112 and the sustain electrodes 113. The first dielectric layer 115 prevents the scan electrodes 112 and the sustain electrodes 113 from being in direct electrical contact during a gas discharge of the plasma display panel 100. In addition, the first dielectric layer 115 prevents the scan electrodes 112 and the sustain electrodes 113 from being damaged due to direct bombardment of positive (+) ions or negative (−) ions on the scan electrodes 112 and the sustain electrodes 113. Furthermore, the first dielectric layer 115 induces charges, thereby accumulating wall charges. The first dielectric layer 115 may be made of PbO, $B_2O_3$, $SiO_2$, or other similar dielectric materials.

The protective layer 116 is formed on the first dielectric layer 115. During the gas discharge of the plasma display panel 100, the protective layer 116 increases secondary electron emission, thereby facilitating the gas discharge. In addition, the protective layer 116 protects a surface of the first dielectric layer 115, thereby preventing a lower lifespan of the scan electrodes 112 and the sustain electrodes 113. The protective layer 116 is made of a material having light transmittance, sputtering resistance, a low discharge voltage, a wide memory margin, driving voltage stability, and so on. For example, the protective layer 116 is made of magnesium oxide (MgO). However, aspects of the present invention are not limited thereto and other materials may be used for the protective layer 116.

The second panel 120 includes a plurality of address electrodes 122, a second dielectric layer 123, barrier ribs 124, and a phosphor layer 125 sequentially formed on a second substrate 121 facing the first substrate 111. The address electrodes 122 are formed on the second substrate 121 in a direction crossing the scan electrodes 112 and the sustain electrodes 113, and are used to supply address signals.

The second dielectric layer 123 is formed on the second substrate 121 in order to cover the address electrodes 122. The second dielectric layer 123 prevents the address electrode 122 from being damaged due to bombardment of positive (+) ions or negative (−) ions on the address electrodes 122. Further, the second dielectric layer 123 induces charges to accumulate wall charges. The second dielectric layer 123 may be made of PbO, $B_2O_3$, or $SiO_2$, or other similar dielectric materials.

In addition, the second dielectric layer 123 is formed to include a short wavelength phosphor material. During a gas discharge of the plasma display panel 100, the second dielectric layer 123 emits visible light to excite the phosphor layer 125. More particularly, the visible light is emitted to a portion of a green phosphor layer 125G (a lower region L shown in FIG. 5) where the excitation efficiency is low in the green phosphor layer 125G, thereby increasing the emission efficiency of the green phosphor layer 125G.

As can be seen from FIG. 3, the excitation efficiency of the lower region L of the green phosphor layer 125G is increased by visible light having wavelength of about 400 to about 530 nm. Accordingly, the second dielectric layer 123 may be made of a short wavelength phosphor material that emits visible light having wavelength of about 400 to about 530 nm. Examples of such a short wavelength phosphor material include blue phosphor material, such as $BaMgAl_{10}O_{17}$:Eu, CaMgO6:Eu, and other similar short wavelength phosphor material. The blue phosphor material is excited by vacuum ultraviolet (VUV) rays generated by a gas discharge and thus emits blue visible light having a wavelength of about 400 to about 530 nm.

The barrier ribs 124 are arranged between the first dielectric layer 115 and the second dielectric layer 123 in order to define a plurality of discharge cells C where a gas discharge occurs. The barrier ribs 124 allow the first panel 110 and the second panel 120 to be maintained with a gap therebetween and also prevent crosstalk between adjacent discharge cells C. For example, the barrier ribs 124 are made of PbO, $B_2O_3$, $SiO_2$, or $Al_2O_3$. However, aspects of the present invention are not limited thereto, and similar materials may be used for the barrier ribs 124. When necessary, the barrier ribs 124 may further include an additive, such as $K_2O$, BaO, or ZnO. The illustrated embodiment of FIG. 2 shows that the barrier ribs 124 are shaped of stripes extending in a longitudinal direction of the plasma display panel 100. However, aspects of the present invention are not limited thereto and the barrier ribs 124 may also be formed to have a polygonal structure of a hexagon or an octagon, or to have a circular or elliptical cross-section.

The phosphor layer 125 includes red (R), green (G) and blue (B) phosphor layers 125R, 125G and 125B formed in the discharge cells C disposed on the second dielectric layer 123. In detail, the red (R), green (G) and blue (B) phosphor layers 125R, 125G and 125B are formed on lateral surfaces of the barrier ribs 124 partitioning the discharge cells and the second dielectric layer 123 between the barrier ribs 124, respectively. The phosphor layer 125 is excited by VUV rays generated by a gas discharge and thus generate visible light. Here, the green phosphor layer 125G, which is a crucial part in determining the emission efficiency of the plasma display panel 100, is formed of a highly excitable green phosphor material, for example, a YAG:Ce($Y_3Al_5O_{12}$:$Ce_3$+) phosphor material. The reason for selecting the YAG:Ce($Y_3Al_5O_{12}$:$Ce_3$+) phosphor material as the green phosphor layer 125G will be briefly described. As can be seen from FIG. 4, the excitation spectrum of the upper region U of the green phosphor layer 125G has superior excitation efficiency corresponding to ultraviolet (UV) ray bands having wavelengths of about 147 nm, 173 nm, and 300 nm or higher. As such, the highly excitable YAG:Ce ($Y_3Al_5O_{12}$:$Ce_3$+) phosphor material is excited by VUV rays generated by a gas discharge, thereby emitting green visible light.

The first panel 110 and the second panel 120, each having the aforementioned structures, are combined with each other, thus forming the plasma display panel 100. Then, air is completely evacuated from the inside of the plasma display panel 100, and an appropriate discharge gas is injected into the discharge cells C to generate a gas discharge. Here, a mixed gas of Ne—Xe, He—Xe, He—Ne—Xe, or other similar mixed gasses, is used as the discharge gas. The gas discharge occurring inside the discharge cells C generates VUV rays. The visible light generated from the phosphor layer 125 is emitted toward the second panel 120 of the plasma display panel 100. Next, the light emission principle of the green phosphor layer 125G, by which the emission efficiency of the plasma display panel 100 is largely determined, will be described.

Figure 5:
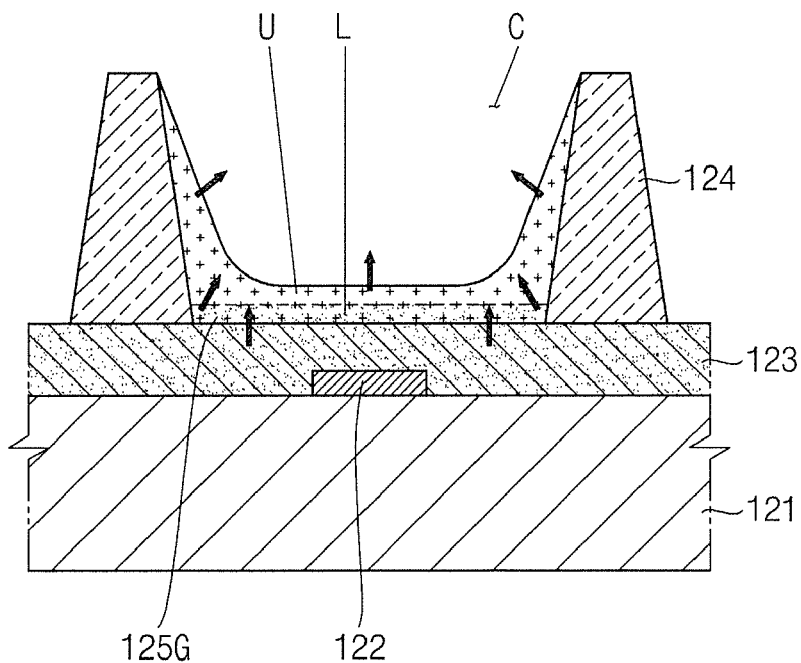
FIG. 5 is a cross-sectional view illustrating the light emission principle of the green phosphor layer shown in FIG. 2.
Figure 6:
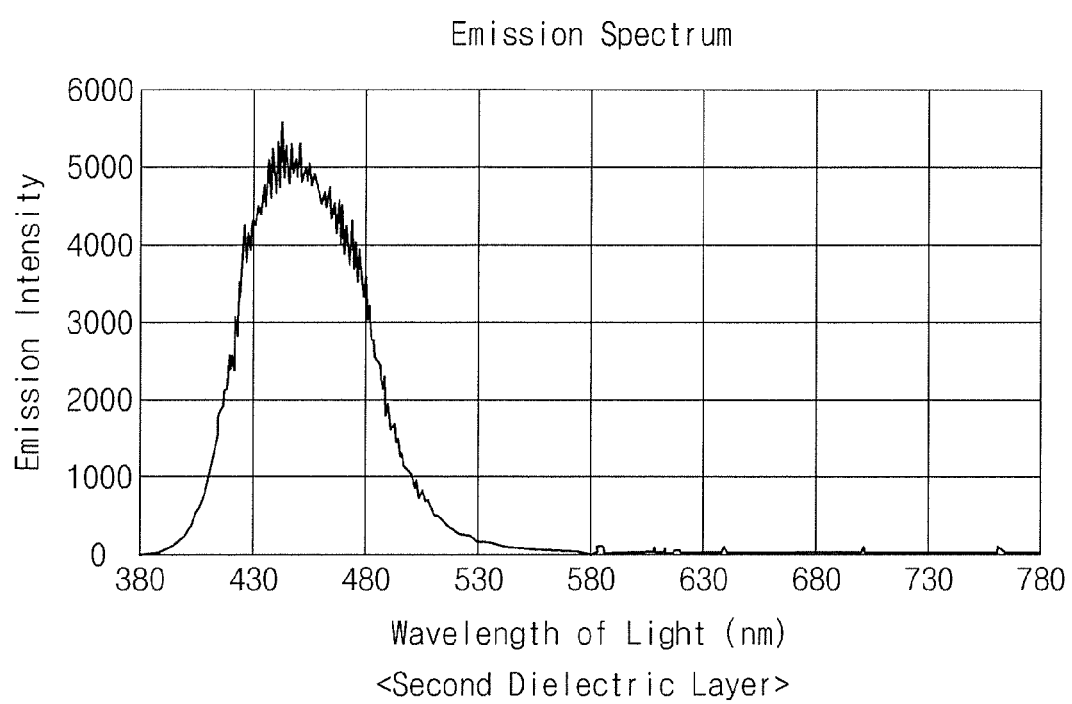
FIG. 6 is a graph illustrating the emission spectrum of a second dielectric layer including a short wavelength phosphor material.

FIG. 5 is a cross-sectional view illustrating the light emission principle of a portion of a green phosphor layer shown in FIG. 2, and FIG. 6 is a graph illustrating the emission spectrum of a second dielectric layer including a short wavelength phosphor material. First, it is assumed that a gas discharge occurs inside the discharge cells C to then generate VUV rays and arrows shown in FIG. 5 indicate visible light. Also, the green phosphor layer 125G of FIG. 5 includes an upper region U and a lower region L. Referring to FIG. 5, the green phosphor layer 125G is excited by the VUV rays generated by the gas discharge occurring inside the discharge cells C and then emits green visible light.

Since the upper region U of the green phosphor layer 125G is exposed to respective gas discharge spaces of the discharge cells C, the upper region U of the green phosphor layer 125G exhibits a high excitation efficiency. Accordingly, the upper region U of the green phosphor layer 125G, when excited by the VUV rays, exhibits high emission efficiency of green visible light.

On the other hand, since the lower region L of the green phosphor layer 125G is farther from the discharge space of the discharge cells C in comparison to the upper region U, the lower region L has relatively low excitation efficiency when compared to the upper region U. Accordingly, the lower region L has a relatively low emission efficiency in emitting green visible light when compared to the upper region U. Since the lower region L is in contact with the second dielectric layer 123, the lower region L is excited by visible light generated by the short wavelength phosphor material of the second dielectric layer 123 that is excited by the VUV rays. Accordingly, the excitation efficiency for the lower region L is further enhanced. Thus, the emission efficiency of the lower region L, when emitting green visible light, is enhanced.

Referring to FIG. 6, when a short wavelength phosphor material is included in the second dielectric layer 123, the second dielectric layer 123 emits a large amount of visible light having wavelengths of about 400 to about 530 nm. This accounts for the suitability of the visible light emitted from the second dielectric layer 123 in order to excite the lower region L of the green phosphor layer 125G. Thus, the green phosphor layer 125G has increased excitation by the visible light having a wavelength of about 400 to about 530 nm.

In the aforementioned plasma display panel 100, the second dielectric layer 123 is formed to include a short wavelength phosphor material, thereby enhancing the excitation efficiency of the portion where the excitation efficiency is relatively low in the green phosphor layer 125G. Accordingly, the plasma display panel 100 increases the excitation efficiency of the overall green phosphor layer 125G, thereby enhancing the emission efficiency thereof.

Figure 7:
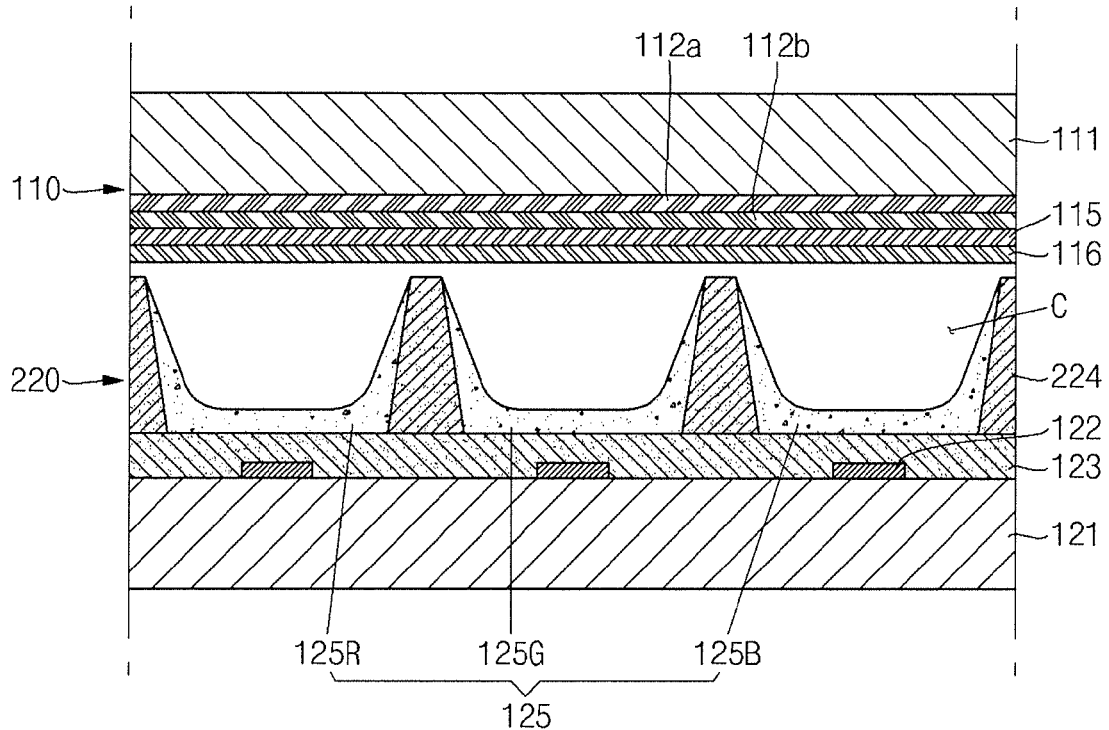
FIG. 7 is a cross-sectional view of a portion of FIG. 2 in a plasma display panel according to another embodiment of the present invention.
Figure 8:
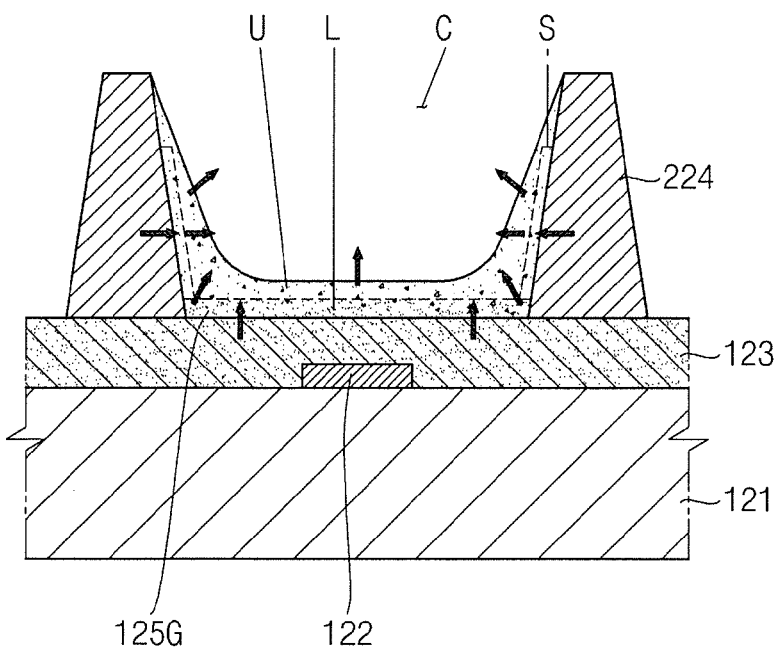
FIG. 8 is a cross-sectional view illustrating the light emission principle of the green phosphor layer shown in FIG. 7.

Hereinafter, a plasma display panel according to another embodiment of the present invention will be described. FIG. 7 is a cross-sectional view of a portion of a the plasma display panel of FIG. 2 according to another embodiment of the present invention, and FIG. 8 is a cross-sectional view illustrating the light emission principle of the green phosphor layer shown in FIG. 7.

The plasma display panel 200 according to another embodiment of the present invention is substantially the same as the plasma display panel in view of configuration, except that barrier ribs 224 (illustrated in FIG. 8) include a short wavelength phosphor material. For convenience of explanation, components having the same function as described in the previous embodiment are respectively identified by the same reference numerals, and their description will not be given below. Thus, the following description will be focused on differences between the present embodiment and the previous embodiment, which include differences between the barrier ribs 224 (illustrated in FIG. 8) of the plasma display panel 200 and the barrier ribs 124 (illustrated in FIG. 5) of the plasma display panel 100, and the light emission principle of the green phosphor layer 125G in the plasma display panel 200.

Referring to FIG. 7, the plasma display panel 200, according to another embodiment of the present invention, includes a first panel 110 and a second panel 220. The first panel 110 includes a plurality of display electrodes 114 (not shown), a first dielectric layer 115 and a protective layer 116 sequentially formed on a first substrate 111. The second panel 220 includes a plurality of address electrodes 122, a second dielectric layer 123 covering the address electrodes 122, barrier ribs 224, and a phosphor layer sequentially formed on a second substrate 121 facing the first substrate 111. The barrier ribs 224 have the same shapes and perform the same functions as the barrier ribs 124 shown in FIG. 2. However, unlike the embodiment shown in FIG. 2, the second dielectric layer 123 and the barrier ribs 224, according to this other embodiment of the present invention illustrated in FIG. 7, include a short wavelength phosphor material and emit visible light.

In the plasma display panel 200 having the barrier ribs 224, the light emission principle of a green phosphor layer 125G will be described below. First, it is assumed that gas discharge occurs within discharge cells C in order to generate VUV rays, and arrows shown in FIG. 8 indicate visible light. Additionally, the green phosphor layer 125G of FIG. 8 includes an upper region U, a lower region L and a side region S. Referring to FIG. 8, the green phosphor layer 125G is excited by the VUV rays generated by the gas discharge occurring inside the discharge cells C, and thus, the green phosphor layer 125G emits green visible light.

Since the upper region U of the green phosphor layer 125G is located at an area exposed to the discharge space of the discharge cells C, the upper region U of the green phosphor layer 125G has a high excitation efficiency. Accordingly, the upper region U of the green phosphor layer 125G exhibits high emission efficiency when emitting green visible light.

On the other hand, since the lower region L of the green phosphor layer 125G is farther from the discharge space of the discharge cells C when compared to the upper region U, the lower region L has a relatively low excitation efficiency when compared to the upper region U. Accordingly, the lower region L has a relatively low emission efficiency when emitting green visible light in comparison to the upper region U. Since the lower region L of the green phosphor layer 125G is in contact with the second dielectric layer 123, the lower region L is excited by visible light generated when the short wavelength phosphor material of the second dielectric layer 123 is excited by the VUV rays. Accordingly, the excitation efficiency of the lower region L can be increased. Thus, the emission efficiency of the lower region L of the green phosphor layer 125G is increased when emitting green visible light.

Additionally, since the side region S of the green phosphor layer 125G is farther from the discharge space of the discharge cells C in comparison to the upper region U, the side region S has a relatively low excitation efficiency when compared to the upper region U. Accordingly, the side region S has a relatively low emission efficiency when emitting green visible light when excited by the VUV rays in comparison to the upper region U. Since the side region S is in contact with the barrier ribs 224, the side region S is excited by visible light generated when a short wavelength phosphor material of the barrier ribs 224 is excited by the VUV rays. Accordingly, the excitation efficiency of the side region S is enhanced. Thus, the emission efficiency of the side region S is enhanced when emitting green visible light.

As described above, the plasma display panel 200, according to another embodiment of the present invention, is configured such that the second dielectric layer 123 is formed to be in contact with the phosphor layer 125 and the barrier ribs 224 are formed to include a short wavelength phosphor material. Thus, the excitation efficiency is enhanced in the portion where the excitation efficiency is relatively low in the green phosphor layer 125G. Accordingly, the plasma display panel 200, according to another embodiment of the present invention, further enhances the excitation efficiency of the overall green phosphor layer 125G when compared to the plasma display panel 100 according to an embodiment of the present invention, thereby further increasing the emission efficiency.

Next, results of the luminance and emission spectrum of the plasma display panel measured in various conditions will be described. FIG. 9 illustrates luminance data of a green phosphor layer of a plasma display panel measured in various conditions, and FIG. 10 is a graph illustrating the emission spectrum of the green phosphor layer of the plasma display panel measured in various conditions.

Figure 10:
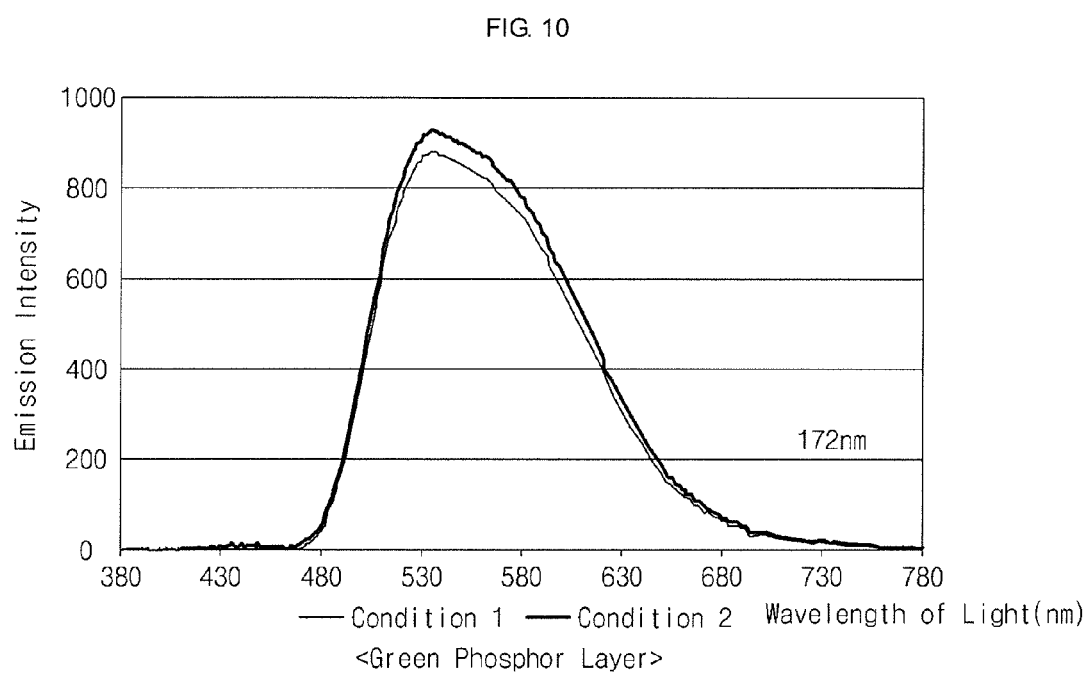
FIG. 10 is a graph illustrating emission spectrum of the green phosphor layer of the plasma display panel measured in various conditions.

In FIGS. 9 and 10, condition 1 indicates a case where the green phosphor layer of the plasma display panel is formed of a YAG:Ce($Y_3Al_5O_{12}$:$Ce_3$+) phosphor material, and condition 2 indicates cases where the green phosphor layer of the plasma display panel is formed of a YAG:Ce($Y_3Al_5O_{12}$:$Ce_3$+) phosphor material, and a second dielectric layer and barrier ribs are formed to include a short wavelength phosphor material, respectively. Additionally, condition 3 indicates case where, in the absence of the green phosphor layer, the second dielectric layer and the barrier ribs are formed to include a short wavelength phosphor material.

As can be seen from the table illustrated in FIG. 9, at the condition 1, when a wavelength of light (VUV) is 146 nm in the first measurement, an X color coordinate, a Y color coordinate and a luminance of the green phosphor layer was measured as 0.404, 0.560 and 20.79, respectively. Here, the luminance is a relative luminance of the green phosphor layer and is indexed to be 100.0% as a reference value. Furthermore, at the condition 2 when a wavelength of light (VUV) is 146 nm in the first measurement, the X color coordinate, the Y color coordinate and the luminance of the green phosphor layer was measured as 0.404, 0.557 and 22.97, respectively, and the luminance is 110.5% of the reference value. Thus, the emission efficiency of the green phosphor layer in the condition 2 was improved by approximately 10% or greater when compared to the condition 1 when the wavelength of light (VUV) is 146 nm.

At the condition 1, when a wavelength of light (VUV) is 172 nm in the second measurement, the X color coordinate, the Y color coordinate and the luminance of the green phosphor layer was measured as 0.404, 0.560 and 88.56, respectively. Here, the luminance is a relative luminance of the green phosphor layer and is indexed to be 100.0% as a reference value. Furthermore, at the condition 2 when a wavelength of light (VUV) is 172 nm in the second measurement, the X color coordinate, the Y color coordinate and the luminance of the green phosphor layer was measured as 0.404, 0.555 and 93.70, respectively, and the luminance is 105.5% of the reference value. Thus, the emission efficiency of the green phosphor layer in the condition 2 was improved by approximately 5% or greater when compared to the condition 1 with the wavelength of light (VUV) is 172 nm.

As described above, in the first measurement, the emission efficiency of the green phosphor layer was improved more in the condition 2 in comparison to the condition 2 in the second measurement. The reason of the foregoing will now be briefly described. In the condition 3 of the first measurement, the relative luminance was 4%, which is higher than the relative luminance in the condition 3 of the second measurement, which is, 2.8%. These findings indicate that the higher the luminance generated from the second dielectric layer and the barrier ribs, the higher the emission efficiency of the green phosphor layer.

In addition, at the condition 1 when a wavelength of light (VUV) is 146 nm in the third measurement, the X color coordinate, the Y color coordinate and the luminance of the green phosphor layer was measured as 0.405, 0.560 and 20.36, respectively. Here, the luminance is a relative luminance of the green phosphor layer and is indexed to be 100.0% as a reference value. Furthermore, at the condition 2 when the wavelength of light (VUV) is 146 nm in the third measurement, the X color coordinate, the Y color coordinate and the luminance of the green phosphor layer was measured as 0.404, 0.557 and 22.62, respectively, and the luminance is 111.1% of the reference value. These findings indicate that when the wavelength of light is 146 nm, on the average the emission efficiency of the green phosphor layer measured in the condition 2 was approximately 10% higher than that in the condition 1.

At the condition 1, when the wavelength of light (VUV) is 172 nm in the fourth measurement, the X color coordinate, the Y color coordinate and the luminance of the green phosphor layer was measured as 0.404, 0.560 and 88.56, respectively. Here, the luminance is a relative luminance of the green phosphor layer and is indexed to be 100.0% as a reference value. Furthermore, at the condition 2 when the wavelength of light (VUV) is 172 nm in the fourth measurement, the X color coordinate, the Y color coordinate and the luminance of the green phosphor layer was measured as 0.404, 0.555 and 93.70, respectively, and the luminance is 105.8% of the reference value. These findings indicate that when wavelength of light is 172 nm, on the average the emission efficiency of the green phosphor layer measured in the condition 2 was approximately 5% higher than that in the condition 1.

As described above, the results of the third measurement also demonstrated that the emission efficiency of the green phosphor layer measured in the condition 2 was approximately 10% higher than that in the condition 1. On the other hand, the results of the fourth measurement demonstrated that the emission efficiency of the green phosphor layer measured in the condition 2 was approximately 5% higher than that in the condition 1. The reason of the foregoing will now be briefly described. That is, in the condition 3 of the first measurement, the relative luminance of visible light that excites a lower region (L of FIG. 8) of a green phosphor layer and a side region (S of FIG. 8) of the green phosphor layer, that is, the visible light emitted from a second dielectric layer and barrier ribs, was 4%, which is higher than the relative luminance of visible light that excites the lower region (L of FIG. 8) of the green phosphor layer and the side region (S of FIG. 8) of the green phosphor layer in the condition 3 of the fourth measurement, that is, 2.8%. These findings indicate that the higher the luminance generated from the second dielectric layer and the barrier ribs, the higher the emission efficiency of the green phosphor layer on the average.

FIG. 10 is a graph comparing the emission spectrums of the condition 1 and the condition 2, when the wavelength of light (VUV) is 172 nm. As shown in FIG. 10, the green phosphor layer exhibits higher emission efficiency in the condition 2 than in the condition 1.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A plasma display panel, comprising:
    a first substrate;
    a second substrate facing the first substrate;
    a plurality of display electrodes on the first substrate;
    a first dielectric layer on the first substrate covering the display electrodes;
    a plurality of address electrodes on the second substrate extending in a direction crossing the display electrodes;
    a second dielectric layer on the second substrate covering the address electrodes;
    barrier ribs in a space between the first dielectric layer and the second dielectric layer and forming a plurality of discharge cells; and
    phosphor layers including a red phosphor layer, a green phosphor layer and a blue phosphor layer inside respective discharge cells,
    the second dielectric layer comprises a phosphor material that emits visible light.

2. The plasma display panel of claim 1, wherein the phosphor material is a blue phosphor material.

3. The plasma display panel of claim 1, wherein the phosphor material is $BaMgAl_{10}O_{17}$:Eu or $CaMgO_6$:Eu.

4. The plasma display panel of claim 1, wherein the phosphor material has a wavelength of about 400 to about 530 nm.

5. The plasma display panel of claim 1, wherein an upper region of the green phosphor layer is excited by ultraviolet rays generated by a gas discharge to emit green visible light.

6. The plasma display panel of claim 1, wherein a lower region of the green phosphor layer is in contact with the second dielectric layer, and emits green visible light by visible light generated from the phosphor material of the second dielectric layer.

7. The plasma display panel of claim 1, wherein the green phosphor layer comprises a YAG:Ce phosphor material.

8. The plasma display panel of claim 1, wherein the barrier ribs comprise the phosphor material.

9. The plasma display panel of claim 8, wherein a side region of the green phosphor layer is in contact with the barrier ribs, and emits green visible light by visible light generated from the phosphor material of the barrier ribs.

10. A plasma display panel, comprising:
    a first substrate;
    a second substrate facing the first substrate;
    a plurality of display electrodes on the first substrate;
    a first dielectric layer on the first substrate covering the display electrodes;
    a plurality of address electrodes on the second substrate extending in a direction crossing the display electrodes;
    a second dielectric layer on the second substrate covering the address electrodes;
    barrier ribs in a space between the first dielectric layer and the second dielectric layer and forming a plurality of discharge cells; and
    phosphor layers including a red phosphor layer, a green phosphor layer and a blue phosphor layer inside respective discharge cells,
    wherein the barrier ribs comprise a phosphor material that emits visible light.

11. The plasma display panel of claim 10, wherein a side region of the green phosphor layer is in contact with the barrier ribs, and emits green visible light by visible light generated from the phosphor material of the barrier ribs.

12. The plasma display panel of claim 10, wherein the phosphor material is a blue phosphor material.

13. The plasma display panel of claim 10, wherein the phosphor material is $BaMgAl_{10}O_{17}$:Eu or $CaMgO_6$:Eu.

14. The plasma display panel of claim 10, wherein the phosphor material has a wavelength of about 400 to about 530 nm.

15. The plasma display panel of claim 10, wherein an upper region of the green phosphor layer is excited by ultraviolet rays generated by a gas discharge to emit green visible light.

16. The plasma display panel of claim 10, wherein the second dielectric layer comprises the phosphor material.

17. The plasma display panel of claim 16, wherein a lower region of the green phosphor layer is in contact with the second dielectric layer, and emits green visible light by visible light generated from the phosphor material of the second dielectric layer.

18. The plasma display panel of claim 10, wherein the green phosphor layer comprises a YAG:Ce phosphor material.

* * * * *